United States Patent
Park et al.

(10) Patent No.: US 7,277,250 B2
(45) Date of Patent: Oct. 2, 2007

(54) TRACK ZERO DETERMINATION METHOD USED IN DATA STORAGE SYSTEM AND DISK DRIVE USING THE SAME

(75) Inventors: Seung-chul Park, Suwon-Si (KR); Kwang-jo Jung, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 294 days.

(21) Appl. No.: 11/019,667

(22) Filed: Dec. 23, 2004

(65) Prior Publication Data

US 2005/0152253 A1    Jul. 14, 2005

(30) Foreign Application Priority Data

Dec. 26, 2003    (KR) .................... 10-2003-0097801

(51) Int. Cl.
G11B 21/02    (2006.01)
G11B 5/596    (2006.01)
G06F 12/00    (2006.01)

(52) U.S. Cl. .................. 360/75; 360/77.02; 360/78.04; 711/4

(58) Field of Classification Search ...................... None
See application file for complete search history.

(56) References Cited

U.S. PATENT DOCUMENTS 5,153,784 A    10/1992    Kitamura ..................... 360/60
5,796,546 A    8/1998    Sasamoto et al. ........ 360/78.04
5,940,242 A    8/1999    Lee ............................. 360/78.8
2003/0081341 A1*    5/2003    Wilson ........................ 360/69
2005/0041321 A1*    2/2005    Settje et al. ............. 360/77.02

FOREIGN PATENT DOCUMENTS

JP    61-229202    10/1986
KR    99-0061745    7/1999

* cited by examiner

Primary Examiner—Andrew L. Sniezek
(74) Attorney, Agent, or Firm—Staas & Halsey LLP

(57) ABSTRACT

An optimal track zero determination method used in a hard disk drive and a hard disk drive using the method. The method has the operations: (a) performing a sequential seek operation on target tracks of a disk, in units of predetermined numbers of tracks, outwardly, from a track separate from a physical track zero position obtained in a servo track write operation, by a predetermined distance toward the physical track zero position; (b) determining whether the target tracks belong to a region where a track-following operation is normally performed, and determining whether an actuator arm connected to a transducer is in contact with a mechanical buffering unit during the sequential seek operation of operation (a); and (c) selecting as a logical track zero, the target track belonging to the region where the track following operation is normally performed and the actuator arm is not in contact with the mechanical buffering unit.

32 Claims, 8 Drawing Sheets

TRACK ROTATION TRAJECTORY | SERVO INFORMATION

TRACK ZERO DETERMINATION METHOD USED IN DATA STORAGE SYSTEM AND DISK DRIVE USING THE SAME

CROSS-REFERENCE TO RELATED APPLICATIONS

This application claims the priority of Korean Patent Application No. 2003-97801, filed on Dec. 26, 2003, in the Korean Intellectual Property Office, the disclosure of which is incorporated herein by reference.

BACKGROUND OF THE INVENTION

1. Field of the Invention

The present invention relates to a data storage system and a method of controlling the data storage system, and more particularly, to an optimal track zero determination method used in a disk drive, and a disk drive using the method.

2. Description of the Related Art

Related techniques are disclosed in U.S. Pat. No 5,796,546 and Korean Patent Laid-open No. 1999-061745.

In a seek control apparatus for a disk drive disclosed in U.S. Pat. No. 5,796,546, defects on a disk is detected and extracted, and target track position information is changed by using extracted defect position, so that any defects cannot exist along a seek path. In a logical track zero position determination method used in a disk drive disclosed in Korean Patent Laid-open No.1999-061745, a logical track zero position is determined by using a measured expansion coefficient of an O-ring and a bias force.

In general, a hard disk drive, an example of a data storage apparatus, contributes to computer system operation by reading and/or writing data from and/or to a disk by using a magnetic head. As the hard disk drive has a tendency to have a high capacity, a high density, and a compact size, a bit per inch (BPI) measurement in a rotational direction, and a track per inch (TPI) measurement in a radial direction of the hard disk drive become large. As a result, there is a demand for a highly accurate mechanism in the hard disk drive.

The hard disk drive comprises a head disk assembly (HDA) and a printed circuit board (PCB) assembly electrically controlling the HDA to read and/or write data from and/or to the disk. The HDA comprises a disk on which data is recorded, a head to read and/or write the data from and/or to the disk, a spindle motor rotating the disk, an actuator arm moving the head, a voice coil motor (VCM), and an outer crash stop (OCS) limiting a displacement of the actuator arm. Here, the OCS is an example of mechanical buffering unit preventing the head from moving to a position of the disk where servo information is not recorded.

As the hard disk drive has a tendency to have a high recording density, there is a problem in that it takes a long time to record the servo information on the disk.

To solve the problem, one solution that has been developed is an offline servo track write (Offline STW) method for recording the servo information on a plurality of disks at one time by using an external apparatus before the disk is assembled.

But, in a case where the Offline STW method is used, a center of a disk is not aligned to the shaft of the spindle motor due to a mechanical error of the OCS, as well as a mechanical error occurring at the time when the disk is assembled. If the center of the disk is not aligned to the shaft of the spindle motor, the servo information may be recorded not on a region around the shaft of the spindle motor, but a region centered on the disk. As is shown in FIGS. 2A and 2B, a trajectory of the head moving along the servo-information-recorded positions is different from an actual trajectory of the disk rotating. As a result, hard disk drives have different following-prohibited regions of their own disks.

In the conventional hard disk drives, the same positions on the disks of the different hard disk drives are determined to be the logical track zero position irrespective of assembled states of the disk drives. Therefore, there is a problem in that the logical track zero position may exist on the following-prohibited region. In addition, even if the logical track zero position exists on a following-allowable region, the hard disk drive having defects on a system region may be treated as a defective hard disk drive.

SUMMARY OF THE INVENTION

The present invention provides a track zero determination method of adaptively determining a logical track zero position in accordance with an assembled state of a disk and defects in a system region. The present invention provides a disk drive using the method.

According to an aspect of the present invention, there is provided a track zero determination method in a disk drive, the method comprising: (a) performing a sequential seek operation on target tracks of a disk, in units of predetermined numbers of tracks, outwardly, from a track separate from a physical track zero position obtained in a servo track write operation, by a predetermined distance toward the physical track zero position; (b) determining whether the target tracks belong to a region where a track-following operation is normally performed, and determining whether an actuator arm connected to a transducer is in contact with a mechanical buffering unit during the sequential seek operation of operation (a); and (c) selecting as a logical track zero, the target track belonging to the region where the track following operation is normally performed and the actuator arm is not in contact with the mechanical buffering unit.

According to another aspect of the present invention, there is provided a track zero determination method in a disk drive, the method comprising: (a) selecting an initial logical track zero value of a disk using a logical track zero determination method; (b) determining whether there is a defect in a track of a system region based on the logical track zero value, wherein the system region is a region where system information is written; (c) resetting a track next to the track having the defect as a logical track zero value if there is a defect in a track of the system region, and if not, determining a current logical track zero value to be a final logical track zero value; and (d) comparing the reset logical track zero value with a predetermined threshold value, treating the disk drive as defective if the reset logical track zero value is more than the threshold value, and if not, returning to operation (b).

According to another aspect of the present invention, there is provided a disk drive comprising: a disk where servo information is written; a spindle motor rotating the disk; a transducer reading and/or writing information from and/or to the disk; an actuator arm connected to the transducer; a mechanical buffering unit limiting a displacement of the actuator arm; a voice coil motor (VCM) rotating the actuator arm to move the transducer on the disk; a memory storing firmware used to control the disk drive and a logical track zero value; and a controller: controlling the VCM in accordance with a seek routine, determining the logical track zero value in response to a logical track zero determination command by performing a sequential seek operation on target tracks, in units of predetermined numbers of tracks, outwardly, from a track separate from a physical track zero position obtained in a servo track write operation, by a predetermined distance toward the physical track zero position, and selecting as the logical track zero the target track belonging to a region where a track-following operation is normally performed and the actuator arm is not in contact with the mechanical buffering unit during the sequential seek operation, and performing a seek control operation based on the logical track zero value.

According to another aspect of the present invention, there is provided a disk drive comprising: a disk where servo information is recorded; a spindle motor rotating the disk; a transducer reading and/or writing information from and/or to the disk; an actuator arm connected to the transducer; a mechanical buffering unit limiting a displacement of the actuator arm; a Voice Coil Motor (VCM) rotating the actuator arm to move the transducer on the disk; a memory storing firmware used to control the disk drive and a logical track zero value; and a controller: controlling the VCM in accordance with a seek routine; determining the logical track zero value by using a predetermined logical track zero determination method and a method to detect a defect in a track of a system region where system information is written based on the logical track zero value, and resetting as the logical track zero value, a track next to a defective track having the defect in the system region, and performing a seek control operation based on the logical track zero value.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
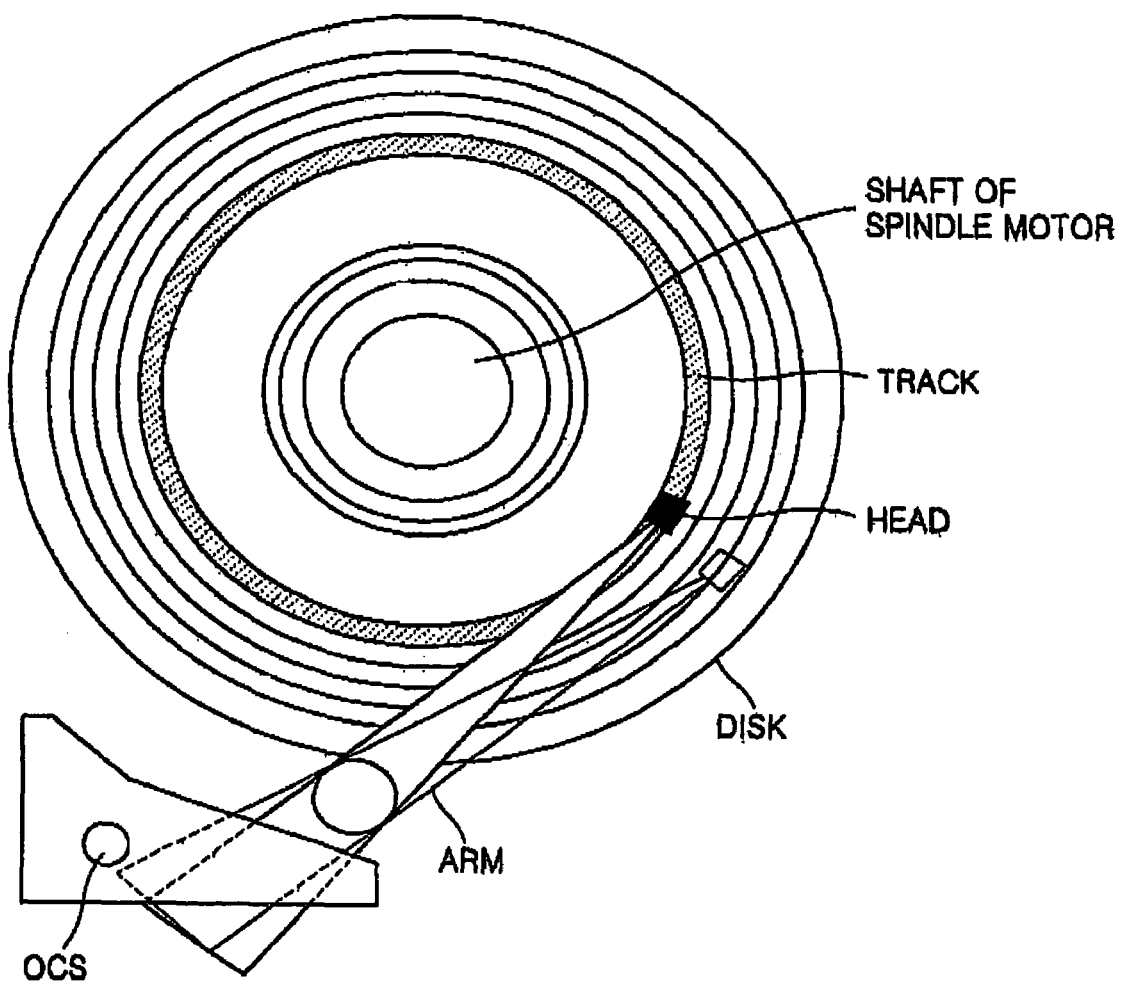
FIG. 1 is a plan view showing a disk drive according to an embodiment of the present invention.
Figure 2A:
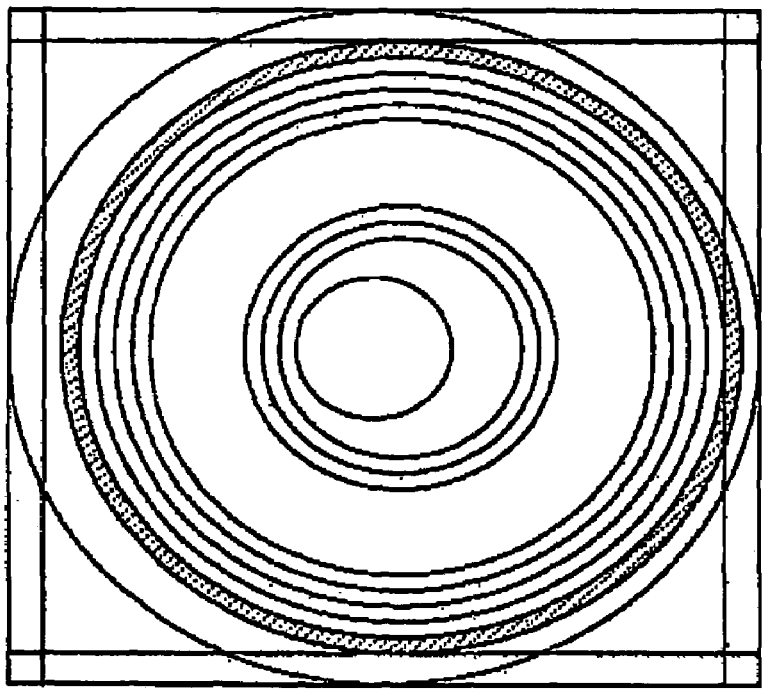
FIGS. 2A and 2B are schematic views showing a disk rotation trajectory and a servo-information-recorded trajectory having an eccentricity in an offline servo track write (Offline STW) method.
Figure 2B:
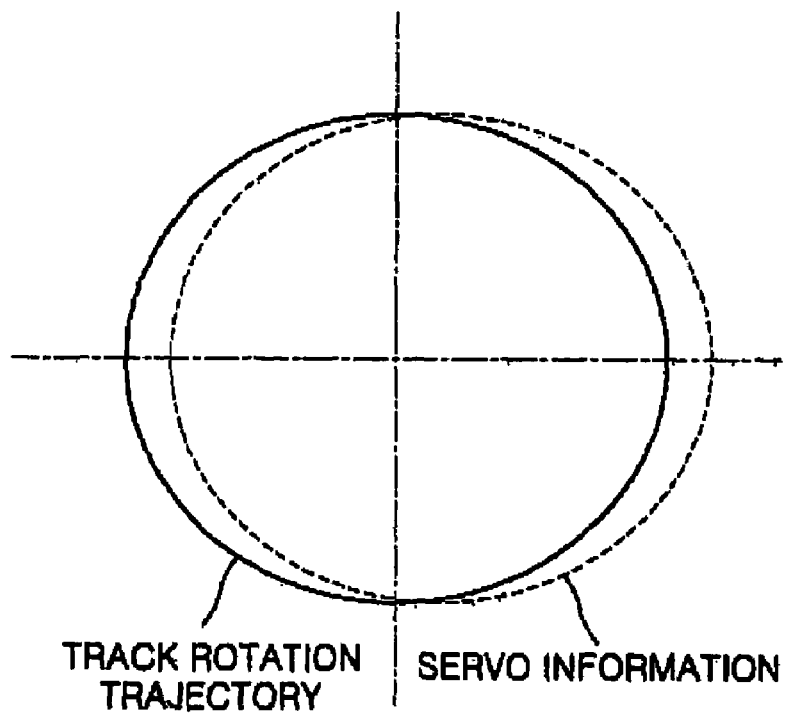

Reference will now be made in detail to embodiments of the present invention, examples of which are illustrated in the accompanying drawings, wherein like reference numerals refer to the like elements throughout. The embodiments are described to explain the present invention by referring to the figures.

"Track zero" is classified into a physical track zero and a logical track zero. The physical track zero is obtained in a servo track write operation, and the logical track zero is used as an actual reference in a disk drive. In general, the logical track zero is referred to as a "track zero."

FIG. 1 is a plan view showing a disk drive according to an embodiment of the present invention. The disk drive shown in FIG. 1 has: a spindle motor with a shaft rotating a disk; an actuator arm with a head at an end thereof, to read and/or write from and/or to tracks of the disk; and an outer crash stop (OCS) limiting a displacement of the actuator arm.

Figure 3:
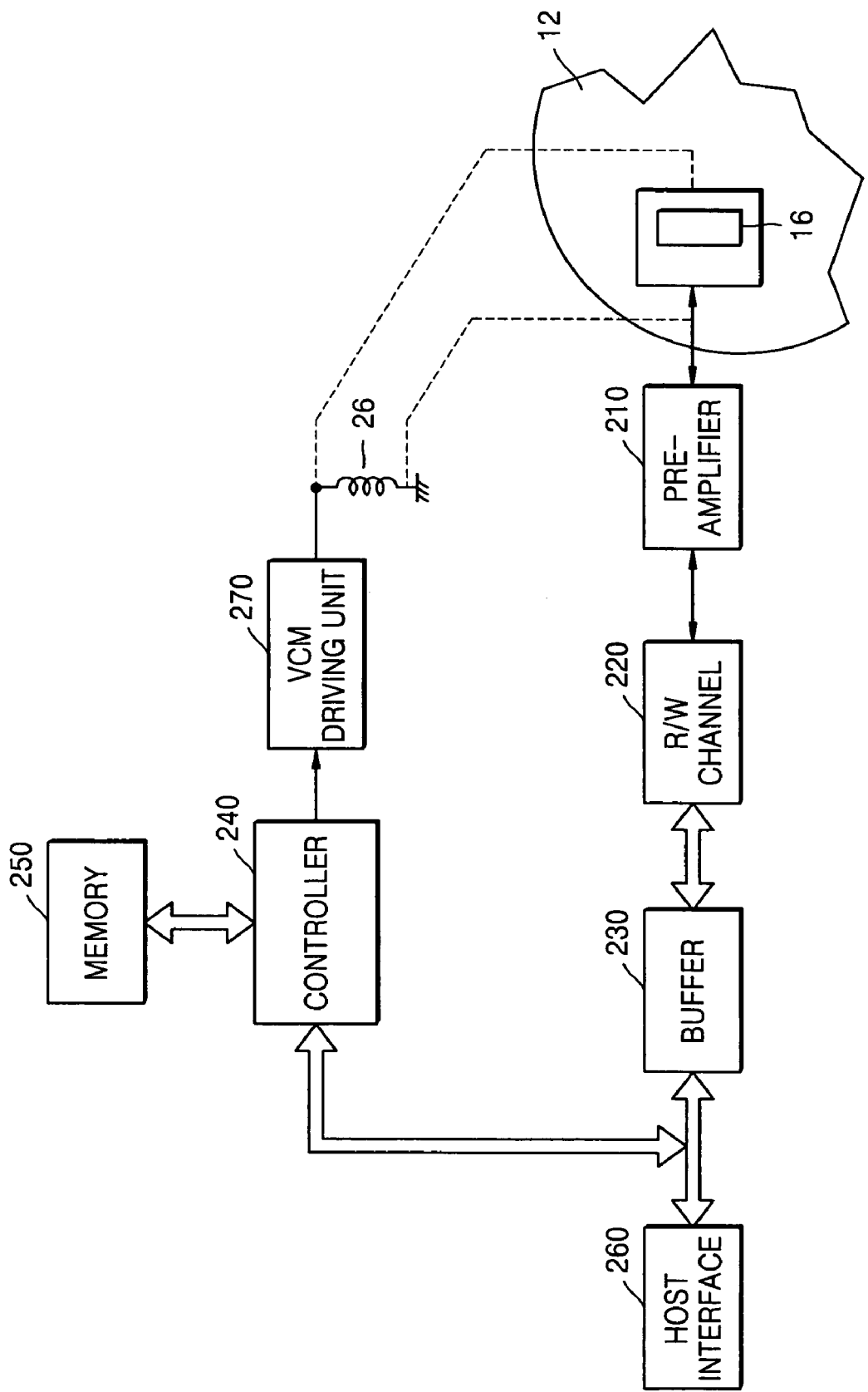
FIG. 3 is a circuit diagram of a disk drive using a track zero determination method according to an embodiment of the present invention.

FIG. 3 is a circuit diagram of a disk drive using a track zero determination method according to an embodiment of the present invention.

The disk drive comprises a disk 12, a transducer 16, a pre-amplifier 210, a read/write (R/W) channel 220, a buffer 230, a controller 240, a memory 250, a host interface 260, and a voice coil motor (VCM) driving unit 270.

The disk 12 has annular tracks. Each track typically contains a plurality of sectors. Each sector may include a data field and an identification field. The identification field may contain gray code information, which identifies the sectors and tracks (cylinders).

The memory 250 stores programs and data used to control the disk drive. In particular, the data used to control the disk drive includes logical track zero information. The memory 250 may be constructed with a non-volatile memory device such as a flash memory device.

Now, a general operation of the disk drive will be described.

In a read mode of the disk drive, the transducer 16, sometimes referred as a head, senses an electrical signal from the disk 12. The electrical signal is amplified by the pre-amplifier 210, so that the electrical signal can be easily processed. The amplified analog signal is encoded into a digital signal by the write/read channel 220, so that the digital signal can be read by a host system. The digital signal is converted into a data stream. The data stream is temporarily stored in the buffer 230, and is transmitted to the host system through the host interface 260.

In a write mode of the disk drive, data is received from the host system, through the host interface 260, and temporarily stored in the buffer 230. The data stored in the buffer 230 is sequentially output and converted into a binary data stream by the read/write channel 220. The data is written on the disk 12 by the transducer 16 using a write current amplified by the pre-amplifier 210.

The controller 240 may be a digital signal process (DSP), a microprocessor, and a microcontroller. The controller 240 applies a control signal to the R/W channel 220 to read and/or write information from and/or to the disk 12. Typically, the information is transmitted from the R/W channel 220 to the host interface circuit 260. The host interface 260 comprises a buffer memory and a control circuit, to interface with a system such as a personal computer.

The controller 240 is connected to the VCM driving circuit 270 to apply a driving current to a voice coil 26. The controller 240 applies a control signal to the VCM driving circuit 270 to control excitation of the VCM and movement of the transducer 16.

The controller 240 is connected to the memory 250. The memory 250 stores commands and data used by the controller 240 to perform software routines. One of the software routines is a seek routine used to move the transducer 16 from one track to another track. The seek routine comprises a servo control routine to ensure that the transducer 16 moves to a correct track.

Figure 4:
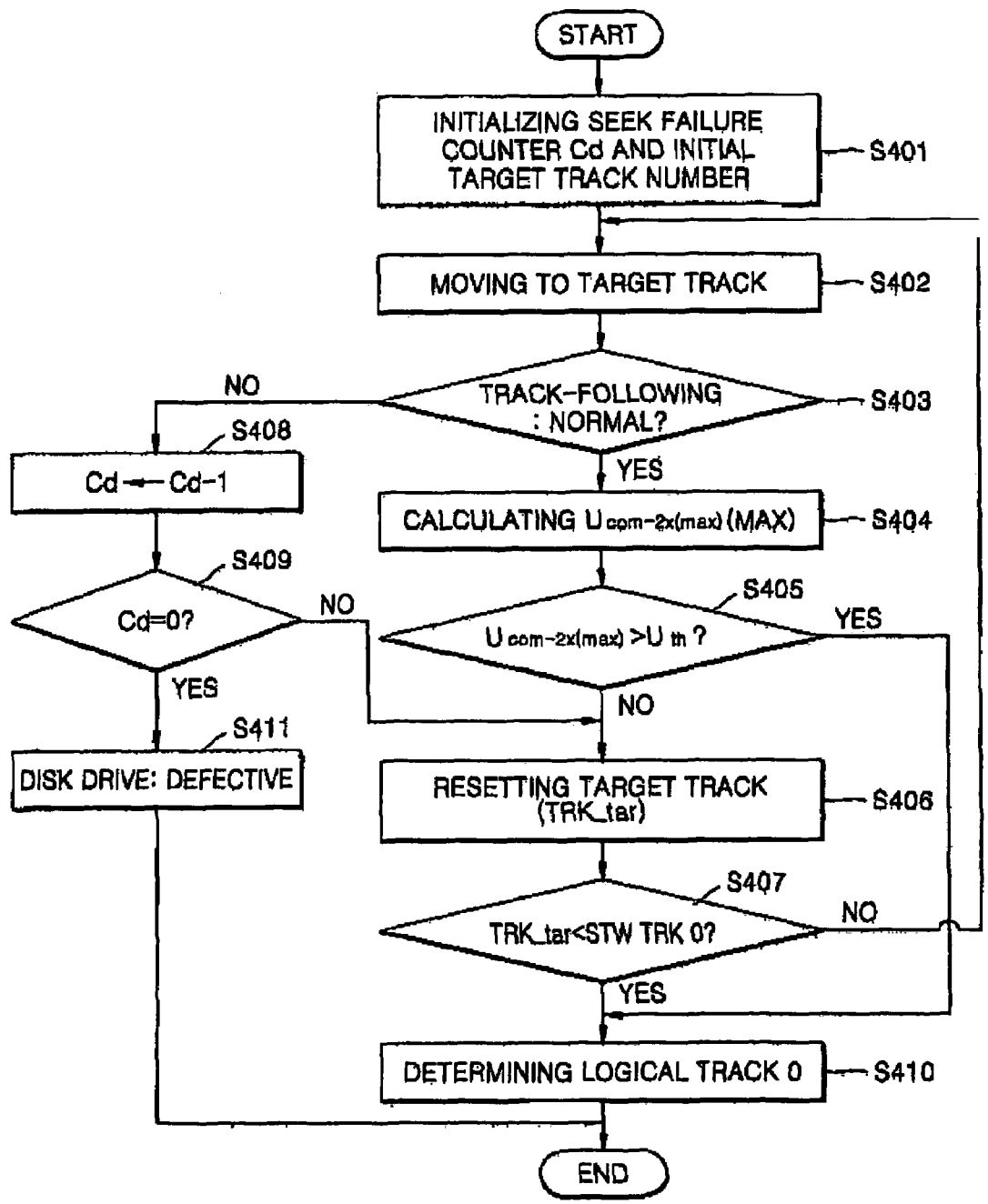
FIG. 4 is a flowchart of a track zero determination method according to an embodiment of the present invention.
Figure 5:
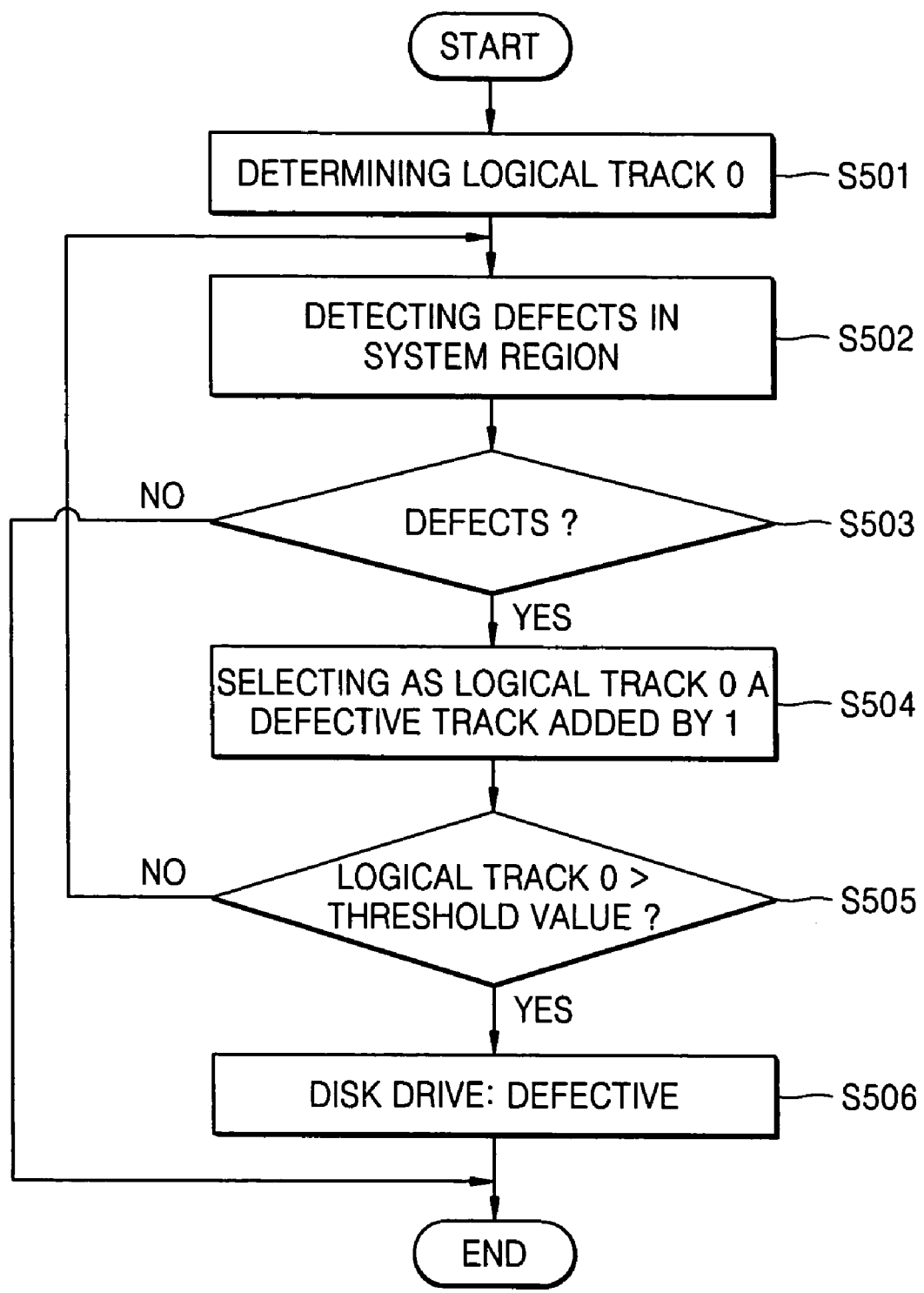
FIG. 5 is a flowchart of a track zero determination method according to another embodiment of the present invention.

The controller 240 executes a control process for determining a logical track zero value shown in flowcharts of FIGS. 4 and 5.

The controller 240 performs a sequential seek operation, in units of predetermined numbers of tracks, outwardly, from a track apart from the physical track zero position obtained in a servo track write operation, by a predetermined distance toward the physical track zero position. In other words, an initial target track is determined to be a track that is a predetermined distance (e.g. a number of tracks) from the physical track zero position obtained in the servo track write operation. In the embodiment shown in FIG. 1, the initial track would be located inward from the physical track zero position, or closer to the shaft of the spindle motor. After the initial target track is determined, the sequential seek operation is performed, seeking the initial target track.

During the seek operation, a track belonging to a region where an outer crash stop (OCS) is not in contact with the actuator arm and a track-following operation is normally performed, is determined to be a logical track zero value. The logical track zero value is stored in the memory 250. The controller 240 performs a seek control operation based on the logical track zero value.

The controller 240 determines an initial logical track zero value of the disk by using a logical track zero determination process shown in the flowchart in FIG. 4. The controller 240 determines whether or not there is a defect in tracks of a system region where system information is recorded, based on the initial logical track zero value. If there is a defect of a track in the system region, a track next to the track having the defect is determined to be the logical track zero value. A final logical track zero value is determined by using a logical track zero changing process. The final logical track zero value is stored in the memory 250. The controller 240 performs the seek control operation based on the final logical track zero value.

Now, a track zero determination method in a data storage system according to an embodiment of the present invention will be described with reference to the flowchart of FIG. 4.

The track zero determination method is performed at an initial stage of a performance test for a head disk assembly (HDA).

Firstly, a seek failure counter Cd (not shown) in the controller 240 and an initial target track number are initialized (operation S401).

The seek failure counter Cd may be designed with a down counter, since a normal following operation on a target track may not be available due to a servo track write failure. Therefore, an initial value of the seek failure counter is set to an allowable maximum seek failure number.

Since the track position corresponding to the OCS cannot be accurately known, the initial target track number is set to a track sufficiently separated from the physical track zero STW_track_0 obtained in a servo track write operation.

A seek operation moving the transducer 16 to the initial target track set in operation S401 is performed in operation S402.

Next, it is determined whether the transducer 16 is normally following the initial target track operation S403. In other words, it is determined whether the transducer correctly follows the initial target track. The determination can be performed by using a maximum value of a position error signal (PES). When the transducer 16 is normally following the initial target track, the PES value is maintained below a threshold value.

In a case where the transducer 16 is determined to be normally following the initial target track, it is determined whether the OCS is in contact with the actuator arm.

In an embodiment of the present invention, the determination whether the OCS is in contact with the actuator arm is performed by using compensated harmonic components of a disk rotational frequency generated by a state feedback method used for a repetitive run out (RRO) compensation process.

The RRO compensation process using the state feedback method is disclosed in detail in Korean Patent No. 10-0212988.

A state equation used in the RRO compensation process using the state feedback method is represented by Equation 1.

$$\begin{bmatrix} r_1(n+1) \\ r_2(n+1) \end{bmatrix} = \begin{bmatrix} \cos(\omega_0 T_s) & -\sin(\omega_0 T_s) \\ \sin(\omega_0 T_s) & \cos(\omega_0 T_s) \end{bmatrix}$$
$$\begin{bmatrix} r_1(n) \\ r_2(n) \end{bmatrix} + \begin{bmatrix} 0 \\ 1 \end{bmatrix} x(n) \begin{bmatrix} r_1(n) \\ r_2(n) \end{bmatrix} + \begin{bmatrix} 0 \\ 1 \end{bmatrix} x(n) \quad \{\text{Equation 1}\}$$

Here, $\omega_0$ is an RRO frequency, $T_s$ is a sampling time, and $x(n)$ is a PES.

Compensated components $u_{com}(n)$ are represented by Equation 2.

$$u_{com}(n) = K_{c1} r_1(n) + K_{c2} r_2(n) \quad \{\text{Equation 2}\}$$

Here, $K_{c1}$ and $K_{c2}$ are compensation gain coefficients.

In particular, a compensated second harmonic component $U_{com\_2x}(n)$ out of the compensated components depends greatly on whether the OCS is in contact with the actuator arm. Therefore, the presently-described embodiment utilizes the compensated second harmonic component $U_{com\_2x}(n)$.

Figure 6A:
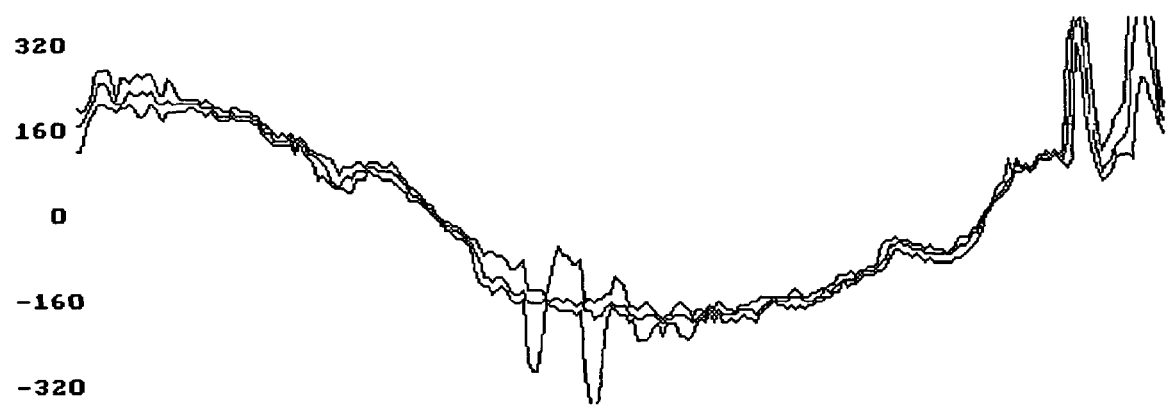
FIG. 6A is a view showing a position error signal (PES) when an actuator arm is not in contact with an outer crash stop (OCS)
Figure 6B:
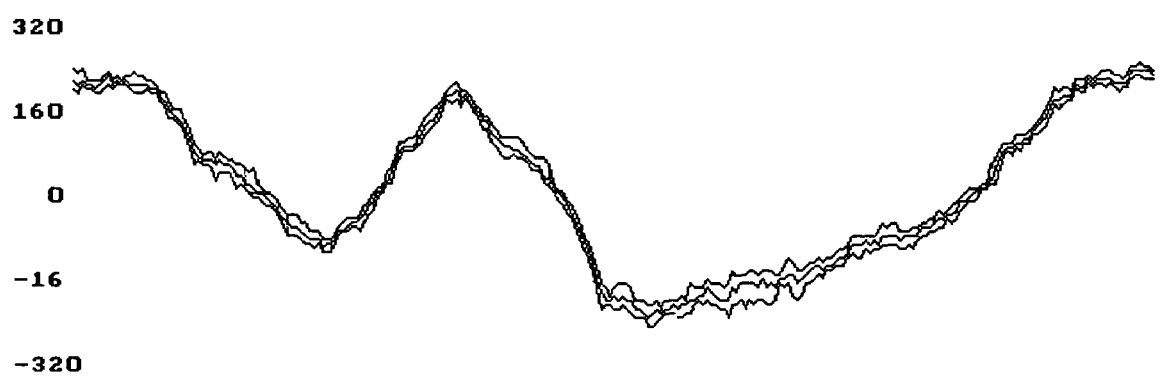
FIG. 6B is a view showing the PES when the actuator arm is in contact with the OCS.

FIG. 6A is a view showing the PES when the actuator arm is not in contact with the OCS, and FIG. 6B is a view showing the PES when the actuator arm is in contact with the OCS.

Figure 7A:
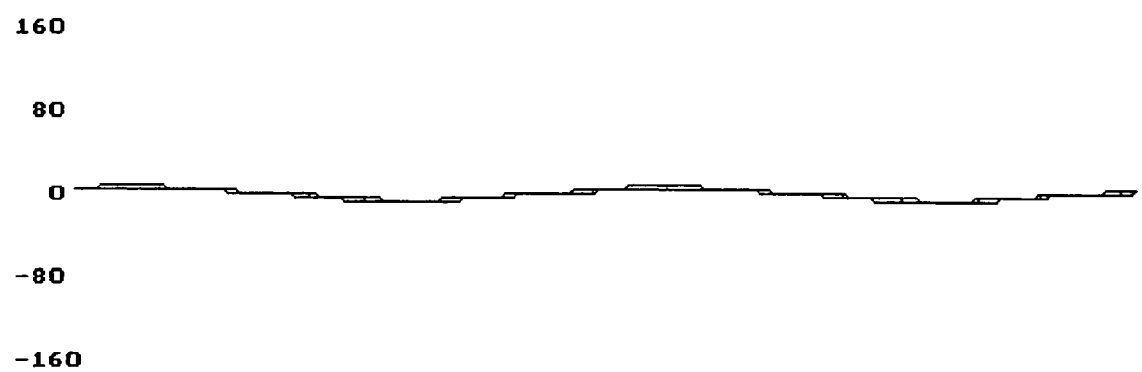
FIG. 7A is a view showing a compensated second harmonic component $u_{com\_2x}(n)$ obtained by a repetitive run out (RRO) compensation process when the actuator arm is not in contact with the OCS.
Figure 7B:
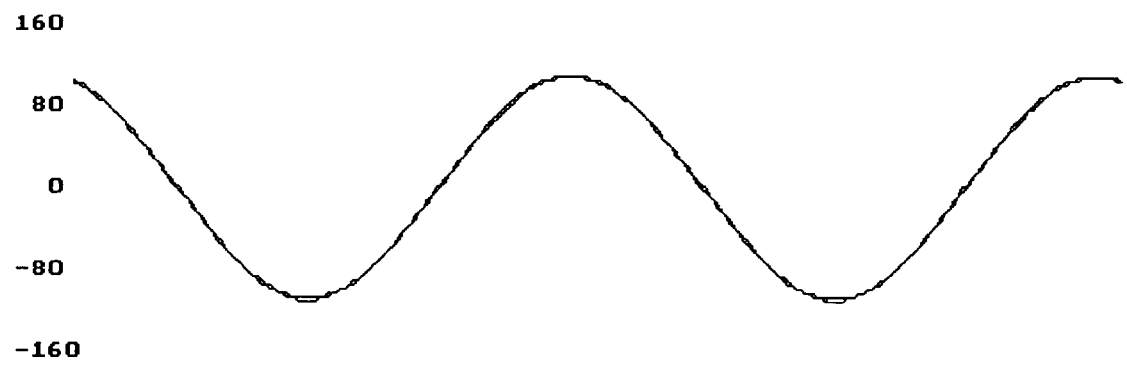
FIG. 7B is a view showing a compensated second harmonic component $u_{com\_2x}(n)$ obtained by the RRO compensation process when the actuator arm is in contact with the OCS.

FIG. 7A is a view showing the compensated second harmonic component $U_{com\_2x}(n)$ when the actuator arm is not in contact with the OCS. The compensated second harmonic component $U_{com\_2x}(n)$ converges to 0. FIG. 7B is a view showing the compensated second harmonic component $U_{com\_2x}(n)$ when the actuator arm is in contact with the OCS. The compensated second harmonic component $U_{com\_2x}(n)$ has a sinusoidal waveform.

As a result, it can be understood that a maximum value $U_{com\_2x}(\max)$ of the compensated second harmonic component $U_{com\_2x}(n)$ depends greatly on whether the OCS is in contact with the actuator arm.

In the presently-described embodiment, it is determined whether the actuator arm is in contact with the OCS by using the maximum value $U_{com\_2x}(\max)$.

The maximum value $U_{com\_2x}(max)$ of the compensated second harmonic component $U_{com\_2x}(n)$ is calculated by using Equation 2 (operation S404).

The maximum value $U_{com\_2x}(max)$ is compared with a threshold value $U_{th}$ (operation S405).

If the maximum value $U_{com\_2x}(max)$ is not more than the threshold value $U_{th}$, it is determined that the actuator arm is not in contact with the OCS. In this case, the target track is reset to another track, separated from the initial target track by a predetermined number of tracks toward the physical track zero STW_TRK_0 position (operation S406).

Next, it is determined whether a value of the reset target track TRK_tar is less than a value of the physical track zero STW_TRK_0 (operation S407). As a result, it can be checked whether the reset target track TRK_tar is located beyond the physical track zero STW_TRK_0.

Next, if the value of the reset target track TRK_tar is not less than the value of the physical track zero STW_TRK_0, the method returns to operation S402.

If the value of the reset target track TRK_tar is less than the value of the physical track zero STW_TRK_0, the reset target track TRK_tar is located at an outer region beyond the physical track zero STW_TRK_0. Therefore, a track corresponding to the reset target track TRK_tar added by certain tracks (in other words, offset by a predetermined number of tracks) is selected as the logical track zero (operation S410).

If, in operation S403, the transducer 16 is determined not to be normally following the initial target track, the value of the seek failure counter Cd is decreased by 1 (operation S408).

Next, it is determined whether the value of the seek failure counter Cd is 0 (operation S409).

If the value of the seek failure counter Cd is not 0, the method returns to operation S406 to reset the target track again.

If the value of the seek failure counter Cd is 0 in operation S409, the disk drive has failed beyond an allowable maximum seek failure number. Therefore, the disk drive is treated as a defective disk drive.

If, in operation S405, if the maximum value $U_{com\_2x}(max)$ is greater than the threshold value $U_{th}$, it is determined that the actuator arm is in contact with the OCS. Therefore, the method returns to the operation S410. In the operation S410, a track corresponding to a current target track TRK_tar added by certain tracks (in other words, offset by a predetermined number of tracks) is selected as the logical track zero.

Accordingly, it is possible to determine a track as being the logical track zero by performing a sequential seek operation, in units of predetermined numbers of tracks, outwardly, from a track apart from a physical track zero position obtained in a servo track write operation, by a predetermined distance toward the physical track zero position, and selecting a track belonging to a region where a track-following operation is normally performed and the actuator arm connected to a transducer is not in contact with the mechanical buffering unit, for example, the OCS, during the sequential seek operation.

The logical track zero value determined in accordance with the aforementioned method shown in FIG. 4 can be used for the disk drive, More effectively, a test for detecting defects in a system region is performed by using the logical track zero value, and a final logical track zero value is determined by using the result of the test.

Now, a track zero determination method according to another embodiment of the present invention will be described with reference to the flowchart of FIG. 5. In the method shown if FIG. 5, a test to determine defects of a system region is performed.

Firstly, a logical track zero LT0 is determined (operation S501). The logical track zero LT0 may be determined by using the logical track zero determination method described with respect to FIG. 4.

Next, the test to determine defects of the system region is performed based on the logical track zero LT0 obtained in operation S501 (operation S502).

In the system region, system information is written and used to read and/or write data from or to a disk drive. The system information includes information on defects located in a data region, servo parameters, and channel parameters. The system region begins at the logical track zero LT0 position.

Next, it is determined whether there are defects in tracks of the system region (S503). The determination is performed track by track while the track number is incremented. As a result, it is determined whether there is an error occurring when the test data is read and/or written from and/or to the system region.

If there is a defect in a track of the system region, the logical track zero LT0 is reset to a track corresponding to the defective track number Ti added by 1 (operation S504). In other words, the logical track zero LT0 is reset to a track that is one track away from the defective track number Ti. In the embodiment shown in FIG. 1, this would correspond to a track located one track closer to the shaft of the spindle motor than a defective track.

Figure 8A:
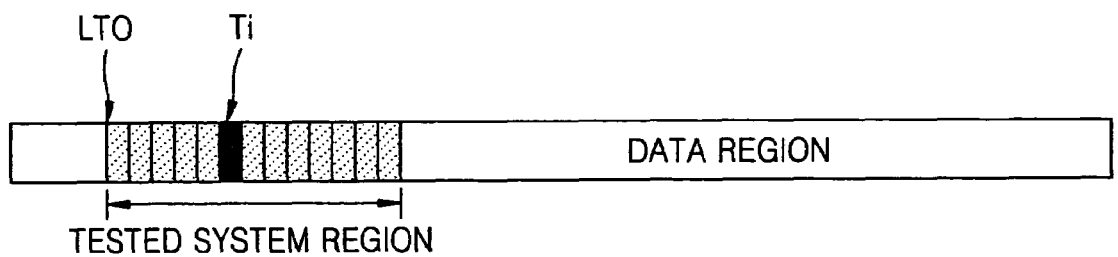
FIGS. 8A and 8B are views for explaining a transition of a logical track zero value in accordance with a result of a test for detecting defects in a system region.
Figure 8B:
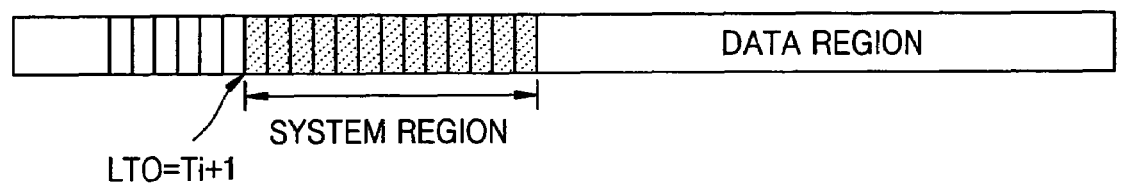

FIG. 8A is a view showing the defective track Ti in the system region. FIG. 8B is a view showing that the logical track zero LT0 is changed and reset to the track corresponding to the defective track number Ti added by 1.

Next, it is determined whether the reset logical track zero LT0 is greater than a threshold value (operation S505). Here, the threshold value is a value to ensure a sufficient track length of a data region, that is, a design specification of capacity of the data region.

If, in operation S505, the reset logical track zero LT0 is not greater than the threshold value, the process returns to operation S502 to perform the test to determine defects of the system region based on the reset logical track zero LT0.

If, in operation S505, the reset logical track zero LT0 is greater than the threshold value, the system region extends too deeply beyond the data region, such that the data region is reduced below the design specification of capacity of the data region. Therefore, the disk drive is treated as defective (operation S506).

If in operation S503, there is no defect in all the tracks of the system region, a current logical track zero LT0 becomes the final logical track zero LT0, and the method ends.

In summary, in the presently-described embodiment, an initial logical track zero is determined by using the method shown in FIG. 4. Next, as described with reference to FIG. 5, a test for detecting defects in a system region is performed, and a final logical track zero is determined by using the initial logical track zero, or the drive is determined to be defective.

According to an embodiment the present invention, since a track zero position in a disk drive using an Offline STW method is determined in accordance with an assembled state of a disk and defects in a system region, an optimal logical track zero position can be determined. Therefore, it is possible to increase yield and performance of the disk drive.

The present invention may be implemented as a method, apparatus, system, etc. When implemented in software, elements of the present invention are essentially code segments to perform necessary tasks. The code segments or a program can be stored in a processor readable medium or transmitted as computer data signals coupled to a carrier wave through a communication medium or network. The processor readable medium includes any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, an optical fiber medium, an RF network, etc. Examples of the computer data signals include any signals that can be transmitted through a transmission medium such as an electronic network channel, an optical fiber, air, an electromagnetic network, and an RF network.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A track zero determination method in a disk drive, the method comprising:
   (a) performing a sequential seek operation on target tracks of a disk, in units of predetermined numbers of tracks, outwardly, from a track separate from a physical track zero position obtained in a servo track write operation, by a predetermined distance toward the physical track zero position;
   (b) determining whether the target tracks belong to a region where a track-following operation is normally performed, and determining whether an actuator arm connected to a transducer is in contact with a mechanical buffering unit during the sequential seek operation of operation (a);
   (c) selecting as a logical track zero, the target track belonging to the region where the track following operation is normally performed and the actuator arm is not in contact with the mechanical buffering unit; and
   (d) treating the disk drive as defective if a number of times that the track-following operation is not normally performed during the sequential seek operation of operation (a) is greater than a predetermined threshold value.

2. The method according to claim 1, wherein the mechanical buffering unit is an outer crash stop (OCS) preventing the transducer from moving to a position where servo information is not written on the disk.

3. A track zero determination method in a disk drive, the method comprising:
   (a) performing a sequential seek operation on target tracks of a disk, in units of predetermined numbers of tracks, outwardly, from a track separate from a physical track zero position obtained in a servo track write operation, by a predetermined distance toward the physical track zero position;
   (b) determining whether the target tracks belong to a region where a track-following operation is normally performed, and determining whether an actuator arm connected to a transducer is in contact with a mechanical buffering unit during the sequential seek operation of operation (a); and
   (c) selecting as a logical track zero, the target track belonging to the region where the track following operation is normally performed and the actuator arm is not in contact with the mechanical buffering unit,
   wherein the determination of whether the actuator arm is in contact with the mechanical buffering unit is based on a compensated harmonic component of a disk rotational frequency obtained by a state feed back method used in a repetitive run out (RRO) compensation process.

4. The method according to claim 3, wherein the harmonic component is a second harmonic component.

5. A track zero determination method in a disk drive, the method comprising:
   (a) selecting an initial logical track zero value of a disk using a logical track zero determination method;
   (b) determining whether there is a defect in a track of a system region based on the logical track zero value, wherein the system region is a region where system information is written;
   (c) resetting a track next to the track having the defect as a logical track zero value if there is a defect in a track of the system region, and if not, determining a current logical track zero value to be a final logical track zero value; and
   (d) comparing the reset logical track zero value with a predetermined threshold value, treating the disk drive as defective if the reset logical track zero value is more than the threshold value, and if not, returning to operation (b).

6. The method according to claim 5, wherein the system information includes information on defects located in a data region, servo parameters, and channel parameters.

7. The method according to claim 5, wherein the system region begins at the logical track zero position.

8. The method according to claim 5, wherein the logical track zero determination method is a method of determining the logical track zero by performing a sequential seek operation on tracks of the disk, in units of predetermined numbers of tracks, outwardly, from a track separate from a physical track zero position obtained in a servo track write operation, by a predetermined distance toward the physical track zero position, and selecting as the logical track zero, a track belonging to a region where a track-following operation is normally performed and an actuator arm connected to a transducer is not in contact with a mechanical buffering unit during the sequential seek operation.

9. The method according to claim 8, wherein the method further comprises a step of treating the disk drive as a defective one if the number of cases where the track-following operation is not normally performed during the sequential seek operation is beyond a predetermined threshold value.

10. The method according to claim 8, wherein the mechanical buffering unit is an OCS preventing the transducer from moving to a position where servo information is not written on the disk.

11. The method according to claim 8, wherein the determination whether the actuator arm is in contact with the mechanical buffering means is based on a compensated harmonic component of a disk rotational frequency obtained by a state feed back method used in an RRO compensation process.

12. The method according to claim 11, wherein the harmonic component is a second harmonic component.

13. A disk drive comprising:
    a disk where servo information is written;
    a spindle motor rotating the disk;
    a transducer reading and/or writing information from and/or to the disk;
    an actuator arm connected to the transducer;

a mechanical buffering unit limiting a displacement of the actuator arm;

a voice coil motor(VCM) rotating the actuator arm to move the transducer on the disk;

a memory storing firmware used to control the disk drive and a logical track zero value; and a controller:

controlling the VCM in accordance with a seek routine, determining the logical track zero value in response to a logical track zero determination command by performing a sequential seek operation on target tracks, in units of predetermined numbers of tracks, outwardly, from a track separate from a physical track zero position obtained in a servo track write operation, by a predetermined distance toward the physical track zero position, and selecting as the logical track zero the target track belonging to a region where a track-following operation is normally performed and the actuator arm is not in contact with the mechanical buffering unit during the sequential seek operation, and performing a seek control operation based on the logical track zero value, wherein the controller performs a process for treating the disk drive as defective if a number of times when the track-following operation is not normally performed during the sequential seek operation of the controller is greater than a predetermined threshold value.

14. The disk drive according to claim 13, wherein the memory is a flash memory device.

15. The disk drive according to claim 13, wherein the mechanical buffering unit is an outer crash stop (OCS) preventing the transducer from moving to a position where servo information is not written on the disk.

16. A disk drive comprising:

a disk where servo information is written;

a spindle motor rotating the disk;

a transducer reading and/or writing information from and/or to the disk;

an actuator arm connected to the transducer;

a mechanical buffering unit limiting a displacement of the actuator arm;

a voice coil motor(VCM) rotating the actuator arm to move the transducer on the disk;

a memory storing firmware used to control the disk drive and a logical track zero value; and a controller:

controlling the VCM in accordance with a seek routine, determining the logical track zero value in response to a logical track zero determination command by performing a sequential seek operation on target tracks, in units of predetermined numbers of tracks, outwardly, from a track separate from a physical track zero position obtained in a servo track write operation, by a predetermined distance toward the physical track zero position, and selecting as the logical track zero the target track belonging to a region where a track-following operation is normally performed and the actuator arm is not in contact with the mechanical buffering unit during the sequential seek operation, and performing a seek control operation based on the logical track zero value, wherein the determination whether the actuator arm is in contact with the mechanical buffering is based on a compensated harmonic component of a disk rotational frequency obtained by a state feed back method used in an RRO compensation process.

17. The disk drive according to claim 16, wherein the harmonic component is a second harmonic component.

18. A disk drive comprising:

a disk where servo information is recorded;

a spindle motor rotating the disk;

a transducer reading and/or writing information from and/or to the disk;

an actuator arm connected to the transducer;

a mechanical buffering unit limiting a displacement of the actuator arm;

a Voice Coil Motor (VCM) rotating the actuator arm to move the transducer on the disk;

a memory storing firmware used to control the disk drive and a logical track zero value; and a controller:

controlling the VCM in accordance with a seek routine;

determining the logical track zero value by using a predetermined logical track zero determination method and a method to detect a defect in a track of a system region where system information is written based on the logical track zero value, and resetting as the logical track zero value, a track next to a defective track having the defect in the system region, and performing a seek control operation based on the logical track zero value.

19. The disk drive according to claim 18, wherein the controller treats the disk drive as defective if a final logical track zero value is greater than predetermined threshold value.

20. The disk drive according to claim 18, wherein the predetermined logical track zero determination method comprises:

performing a sequential seek operation on target tracks, in units of predetermined numbers of tracks, outwardly, from a track apart from a physical track zero position, by a predetermined distance toward the physical track zero position; and selecting as the logical track zero, the target track belonging to a region where a track-following operation is normally performed and the actuator arm is not in contact with the mechanical buffering unit during the sequential seek operation.

21. A method to determine a logical track zero of a disk of an assembled hard disk drive, the method comprising:

initializing a seek failure counter;

determining an initial target track located a predetermined distance from a physical track zero position obtained in a servo track write operation as a current target track;

performing a sequential seek operation, seeking the current target track;

determining whether a transducer of the drive correctly follows the current target track;

if it is determined that the transducer correctly follows the current target track, determining whether an actuator arm connected to the transducer is in contact with a mechanical buffering unit;

if it is determined that the transducer does not correctly follow the current target track, modifying the seek failure counter to be one unit closer to a failure limit;

determining whether the seek failure counter has reached the failure limit;

if it is determined that the seek failure counter has reached the failure limit, determining the disk drive to be defective and ending the method;

if it is determined that one of the seek failure counter has not reached the failure limit, or the actuator is not in contact with the mechanical buffering unit, setting the current target track as a track separated from the previous target track by a predetermined number of tracks toward the physical track zero position;

determining whether a position of the current target track is farther from a spindle motor shaft of the disk drive than the physical track zero position;

if it is determined that the position of the current target track is not farther from the spindle motor shaft than the physical track zero position, performing the sequential seek operation;

if it is determined that one of the position of the current target track is farther from the spindle motor shaft than the physical track zero position, or the actuator arm is in contact with the mechanical buffering unit, selecting the current target track as the logical track zero.

22. The method according to claim 21, wherein the mechanical buffering unit is an outer crash stop preventing the transducer from moving to a position where servo information is not written on the disk.

23. The method according to claim 21, wherein the determining whether the actuator arm is in contact with the mechanical buffering unit is based on a compensated harmonic component of a disk rotational frequency obtained by a state feed back method used in a repetitive run out (RRO) compensation process.

24. The method according to claim 23, wherein the harmonic component is a second harmonic component.

25. A method to determine a logical track zero of a disk of an assembled hard disk drive, the method comprising:
determining a logical track zero in accordance with the method of claim 21;
determining whether a defect is present in a system region of the disk beginning at the logical track zero, and if not, ending the method;
if it is determined that there is a defect present in the system region, resetting the logical track zero to a track located a predetermined distance from a track with the defect;
determining whether a value of the logical track zero exceeds a predetermined threshold value;
if the value of the logical track zero exceeds the predetermined threshold value, determining the disk drive to be defective and ending the method, and if not, performing the determining whether a defect is present in a system region operation.

26. A method to determine a logical track zero of a disk of an assembled hard disk drive, the method comprising:
determining a logical track zero of the disk and setting that track as a current logical track zero;
determining whether a defect is present in a system region of the disk beginning at the current logical track zero, and if not, determining that the current logical track zero is a final logical track zero ending the method;
if it is determined that there is a defect present in the system region, resetting the logical track zero to a track located a predetermined distance from a track with the defect;
determining whether a value of the logical track zero exceeds a predetermined threshold value;
if the value of the logical track zero exceeds the predetermined threshold value, determining the disk drive to be defective and ending the method, and if not, performing the determining whether a defect is present in a system region operation.

27. The method according to claim 26, wherein the system region includes information on defects located in a data region, servo parameters, and channel parameters.

28. A method to determine a logical track zero of a disk of an assembled hard disk drive, the method comprising:
determining an initial target track as a track that is a predetermined distance from a physical track zero position obtained in a servo track write operation;
performing a sequential seek operation, seeking the target track;
determining whether the target track is located in a region of the disk where a transducer of the drive correctly follows tracks,
if so, determining whether an actuator arm connected to the transducer is in contact with a mechanical buffering unit during the sequential seek operation; and
if not, selecting the target track as the logical track zero
wherein the determining whether the actuator arm is in contact with the mechanical buffering unit is based on a compensated harmonic component of a disk rotational frequency obtained by a state feed back method used in a repetitive run out (RRO) compensation process.

29. The method according to claim 28, wherein the mechanical buffering unit is an outer crash stop preventing the transducer from moving to a position where servo information is not written on the disk.

30. The method according to claim 28, wherein the harmonic component is a second harmonic component.

31. A method to determine a logical track zero of a disk of an assembled hard disk drive, the method comprising:
determining a logical track zero of the disk and setting that track as a current logical track zero;
determining whether a defect is present in a system region of the disk beginning at the current logical track zero, and if not, determining that the current logical track zero is a final logical track zero;
if so, resetting the current logical track zero to a track located a predetermined distance from a track with the defect;
determining whether a value of the current logical track zero exceeds a predetermined threshold value;
if not, performing the operation of determining whether a defect is present in the system region.

32. A method to determine a logical track zero of a disk of a disk drive, the method comprising:
adaptively determining a logical track zero position in accordance with an assembled state of a disk drive and defects in a system region of the disk.

* * * * *